United States Patent [19]

Bienert

[11] 3,905,641
[45] Sept. 16, 1975

[54] LEVEL ADJUSTING DEVICE FOR SLIDING ROOFS

[75] Inventor: Horst Bienert, Gauting, Germany

[73] Assignee: Webasto-Werk W. Baier KG, Stockdore, Munich, Germany

[22] Filed: Mar. 18, 1974

[21] Appl. No.: 452,281

[30] Foreign Application Priority Data
Mar. 17, 1973 Germany............................ 2313453

[52] U.S. Cl. ................................ 296/137 F; 49/209
[51] Int. Cl................................................ B60j 7/04
[58] Field of Search......... 296/137 E, 137 F, 137 H, 296/137 R, 137 B, 137 G; 49/209, 255; 52/66

[56] References Cited
FOREIGN PATENTS OR APPLICATIONS
1,655,543  7/1970  Germany......................... 296/137 E
679,166  11/1961  Italy................................ 296/137 R

*Primary Examiner*—Robert J. Spar
*Assistant Examiner*—Gary Auton
*Attorney, Agent, or Firm*—Joseph A. Geiger

[57] ABSTRACT

A level adjusting device for rigid panel automobile sliding roof assemblies in which the lateral panel guide means includes a pivotable guide shoe carrier with a guide shoe engaging a stationary guide profile. The guide shoe carrier is pivotable around an axis arranged parallel to the guide, and adjustment is accomplished by means of a screw whose head is easily accessible from underneath the panel.

8 Claims, 4 Drawing Figures

Fig. 1
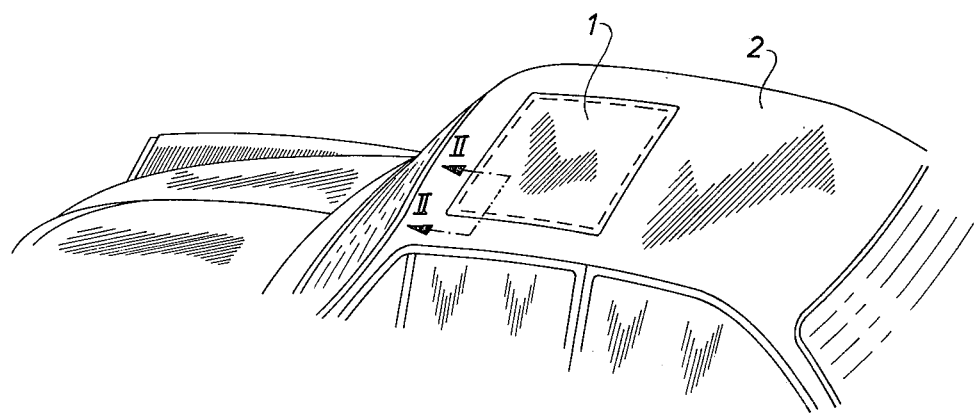
Fig. 2
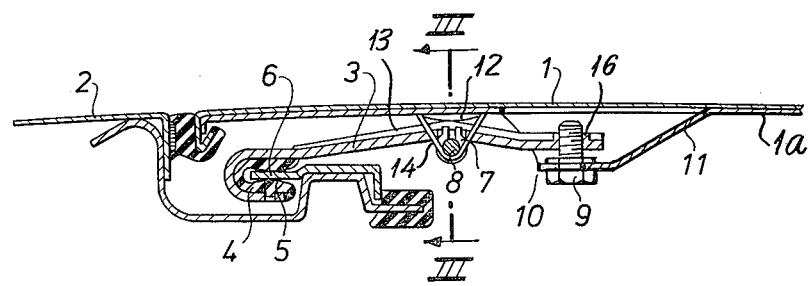
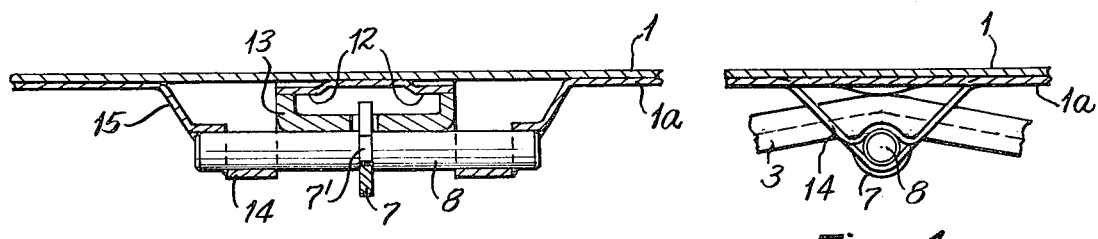
Fig. 3
Fig. 4

LEVEL ADJUSTING DEVICE FOR SLIDING ROOFS

BACKGROUND OF THE INVENTION

1. Field of the Invention

The present invention relates to automobile sliding roof mechanisms, and in particular to level adjusting devices for rigid sliding roof panels which are guided for longitudinal motion by means of lateral guide profiles and cooperating guide shoes.

2. Description of the Prior Art

From the prior art in this field are known several level adjusting devices having a guide shoe carrier which is pivotable about a pivot axis extending parallel to the displacement motion of the sliding roof panel. These prior art devices, however, have not met with commercial success, because they included an eccentric connection cooperating with a clamping screw. This structure is comparatively costly in production and has the additional shortcoming that it is difficult to adjust, due to its poor accessibility.

An additional disadvantage of this type of prior art level adjusting device is related to the fact that, outside a certain limited range of adjustability, the angular disalignment of the guide shoe causes the guide shoe to bind against the guide profile, with the result that the longitudinal movement of the sliding roof panel becomes difficult.

SUMMARY OF THE INVENTION

It is the primary objective of the present invention to overcome the above-mentioned shortcomings, by suggesting an improved level adjusting device of the earlier-mentioned kind which is inexpensive to manufacture, easily accessible for readjustment, and which permits a considerable range of adjustment without any tendency of binding against the guide profiles.

The present invention attains the above objective by suggesting an improved level adjusting device for sliding roofs which is characterized in that the guide shoe carrier is pivotable about a pivot axis which is arranged in parallel alignment with the lateral guide profile and inwardly spaced therefrom, and that the guide shoe carrier acts as a second-degree lever with respect to the stationary guide, the guide shoe being attached to the guide shoe carrier on one end and an adjustment screw engaging it at the other end. This arrangement has the additional advantage of minimized height requirements of the sliding roof mechanism.

Another advantageous feature suggested by the invention is the use of convexly curved contact faces on the guide shoes engaging the stationary guide profile of the sliding roof structure, thereby avoiding the earlier-mentioned binding tendency under extreme adjustment angles.

Additional preferred details of the novel structure of the invention include a pivot arrangement in which the guide shoe carrier is attached to a pivot pin by means of a simple circlip retainer and, rather than having a bore engaging the pin, is confined between the pin and a boss in the sliding roof structure. The guide shoe carrier can thus be a simple metal stamping.

The adjustment screw of the device is preferably of the spindle-type, having an annular retaining groove adjacent its head engaged by a slotted bracket attached to the sliding roof panel. This bracket reaches below the guide shoe carrier, so that the head of the screw is conveniently accessible from underneath the sliding roof panel.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 shows in a perspective representation a sliding roof panel arranged in the roof structure of an automobile;

FIG. 2 represents an enlarged vertical cross section taken along line II—II of FIG. 1; and FIGS. 3 and 4 show, in enlarged detail, the pivot connection of the level adjusting device, FIG. 3 being a cross section along line III—III of FIG. 2.

DESCRIPTION OF THE PREFERRED EMBODIMENT

FIG. 1 shows an outside view of a conventional rigid sliding roof arrangement for automobiles in which the sliding roof panel 1 is openable by first lowering its rear portion and then retracting the panel under the stationary roof portion 2.

In FIG. 2 is illustrated a cross section of the lateral portion of the roof structure with a level adjusting device for the rigid sliding roof panel 1 permitting vertical alignment of the latter in relation to the adjacent stationary roof structure 2. This level adjusting device is combined with the lateral guide means for panel 1, which guide means includes a transversely extending guide shoe carrier 3, a guide shoe 4 attached to its outer end, and a stationary guide profile 6 engaged by the latter. Inside the U-shaped guide shoe 4 is further provided a convexly shaped lining 5.

The guide shoe carrier 3 is pivotably attached to the rigid sliding roof panel 1 at a point inwardly spaced from the guide profile 6. The pivot connection is simply and inexpensively obtained with the aid of a pivot pin 8 confining the flat guide shoe carrier between it and a shallow boss 12 on the inner sheet 1a of panel 1, the lateral position of the guide shoe carrier 3 being determined by two V-shaped extensions 14 of the inner sheet 1a. The guide shoe carrier 3 can thus be manufactured as a simple stamping with a U-shaped end portion on one extremity and a threaded bore 16 on the other extremity.

The pivot connection between the sliding roof panel and the guide shoe carrier 3 is illustrated in more detail in FIGS. 3 and 4 of the drawing. The inner sheet 1a of the roof panel 1 is downwardly extended at 14 and 15 to form a cradle-type support for the pivot pin 8 and to laterally confine the guide shoe carrier 3. The pin 8 in turn is axially secured by a circlip 7 engaging a groove 7' in the pin 8.

The guide shoe carrier 3 acts as a second-degree lever, its inner end with the aforementioned threaded bore being engaged by an adjustment screw 9. The latter is axially confined so as to work like a spindle, when rotated in relation to the guide shoe carrier 3. For this purpose, the adjustment screw 9 includes an annular retaining groove adjacent its head with which it engages a slotted recess 10 in a stationary bracket 11. The bracket 11, formed from the sheet 1a of sliding roof panel 1, reaches below the inner end of the guide shoe carrier 3 so that the head of the adjusting screw 9 becomes conveniently accessible from underneath panel 1.

It should be understood, of course, that the foregoing disclosure describes only a preferred embodiment of the invention and that it is intended to cover all changes and modifications of this example of the invention which fall within the scope of the appended claims.

I claim:

1. In a sliding roof assembly for automobiles in which a rigid sliding roof panel is displaceable from the roof opening through retraction under the rearwardly adjacent stationary roof structure along lateral guide means arranged underneath said panel, a device for adjusting the level of the sliding roof panel in relation to said guide means, the device comprising in combination:
   a lateral guide profile as part of said lateral panel guide means having opposing guide faces adapted to provide vertically determined guidance;
   a guide shoe having at least one guide face engaging said guide profile;
   a guide shoe carrier to which said guide shoe is connected;
   a pivot connection securing said guide shoe carrier to the underside of the sliding roof panel, said pivot connection defining a pivot axis which is fixed in relation to the roof panel and oriented generally parallel to the lateral guide profile while being spaced inwardly therefrom, so that an angular adjustment of the guide shoe carrier about said axis changes the vertical distance between said panel and the lateral guide profile, by vertically shifting the relative levels of the guide shoe and of the pivot connection; and
   spindle means for angularly adjusting the guide shoe carrier about said pivot axis.

2. A level adjusting device as defined in claim 1, wherein:
   the guide shoe carrier extends generally horizontally and acts as a second-degree lever with respect to the lateral guide profile, engaging it with one extremity via said guide shoe, while being vertically adjustable relative to the sliding roof panel at its other extremity by means of said spindle means.

3. A level adjusting device as defined in claim 2, wherein:
   said spindle means is a generally vertically oriented adjusting screw comprising a head, a threaded shaft extending upwardly from the head, and an annular retaining groove; and
   the device further includes a bracket which is integral with said sliding roof panel, the bracket engaging said retaining groove so as to axially confine the adjusting screw.

4. A level adjusting device as defined in claim 2, wherein:
   the guide shoe carrier is a generally flat stamping; and
   said pivot connection is constituted convexly curved opposing contact faces defined by the underside of the sliding roof panel and the upper side of the guide shoe carrier, and means for holding the guide shoe carrier upwardly against the sliding roof panel.

5. A level adjusting device as defined in claim 4, wherein the holding means includes:
   a pivot pin;
   two generally V-shaped buckles extending downwardly from the sliding roof panel on opposite sides of the guide shoe carrier, the pivot pin being carried by said buckles so as to retain the guide shoe carrier; and
   a circlip engaging the pivot pin and cooperating with a recess in the guide shoe carrier so as to secure the guide shoe carrier against the pivot pin.

6. A level adjusting device as defined in claim 1, wherein:
   the guide shoe and the lateral guide profile define between them opposing pairs of guide faces; and
   at least one guide face out of each pair of cooperating guide faces is convexly curved, in order to accommodate a tilting of the guide shoe carrier relative to the guide profile, when the former is adjusted angularly about its pivot axis.

7. A level adjusting device as defined in claim 6, wherein:
   the lateral guide profile includes a horizontally outwardly extending edge portion of a sheet metal profile;
   the guide shoe is U-shaped in its cross-sectional outline so as to embrace said edge portion; and
   those of said guide faces which are defined by the guide profile are parallel, while the contacting guide faces defined by the guide shoe are opposing convexly curved guide faces.

8. A level adjusting device as defined in claim 7, wherein:
   the guide shoe further includes a lining, and its guide faces are surfaces of said lining.

* * * * *